May 23, 1950  F. O. HENNIG  2,509,039

BEARING CASE

Filed March 27, 1945

WITNESSES:
V. A. Peckham
E. O. Johns

INVENTOR
Fritz O. Hennig
BY
Brown, Critchlow & Flick
his ATTORNEYS

Patented May 23, 1950

2,509,039

UNITED STATES PATENT OFFICE 2,509,039

BEARING CASE

Fritz O. Hennig, Greensburg, Pa., assignor to Elliott Company, Jeannette, Pa., a corporation of Pennsylvania Application March 27, 1945, Serial No. 585,072

3 Claims. (Cl. 253—39)

This invention relates to generally cylindrical hollow members one end of which is connected to a high temperature element and the other end of which is relatively cool. More particularly the invention relates to such members that are divided into sections normally connected together at joints extending lengthwise thereof.

A generally cylindrical hollow member which is subjected at only one end to a high temperature will tend to assume a conical shape, due to the temperature gradient along its length. In most cases this ideal condition does not occur, for the ends of the member usually are prevented from assuming a conical shape because of encircling end flanges integral therewith by which the member is connected to other elements. The result is that a longitudinal section of the wall of the member will take the general shape of a flattened reverse curve rather than a substantially straight line as would be the case for a cone. The deviation of this reverse curve from a straight line is a measure of the thermal stress imposed on the member due to the restraining influence of the end flanges. In many cases such a member with end flanges has to be split lengthwise so that it can be assembled around some other element, such as a shaft. If continuous bolting flanges extend along the joints for connecting the sections of the hollow member together, they will prevent the walls adjoining them from following the normal deflection pattern. This raises the thermal stresses in the member still further. Even without continuous bolting flanges it is not unusual to support the lower section of the hollow member by a rigid structure in such a way that it seriously interferes with distortion of that section. These problems are especially serious in gas turbines where the hollow member is a short bearing case attached to one end of the very hot turbine cylinder.

It is an object of this invention to provide a hollow member of the character referred to above which has bolting means extending longitudinally thereof that do not interfere with thermal expansion and contraction of the member symmetrically in cross section. Other objects are to provide such a member in which no elements are attached to the distorted section of the member in locations that will restrain distortion, and in which the thermal stresses due to distortion are kept low in spite of there being a large temperature gradient in a short space.

Figure 1:
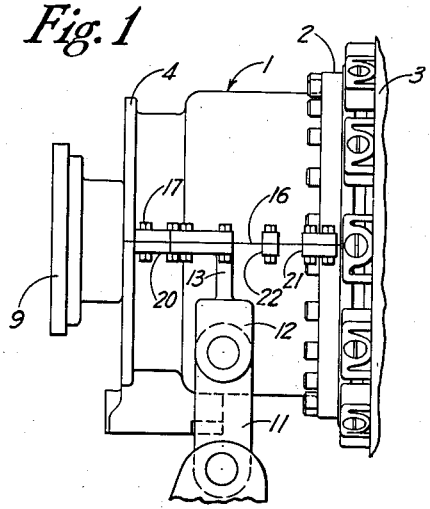
Figure 2:
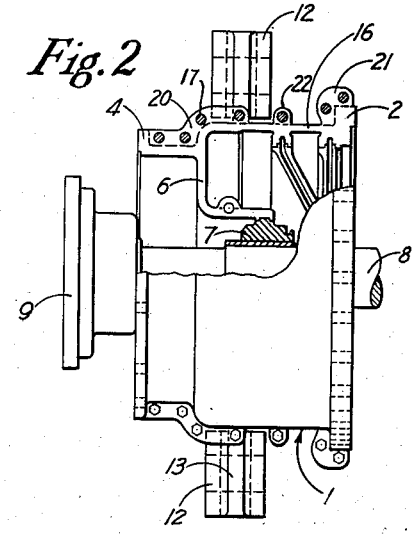
Figure 3:
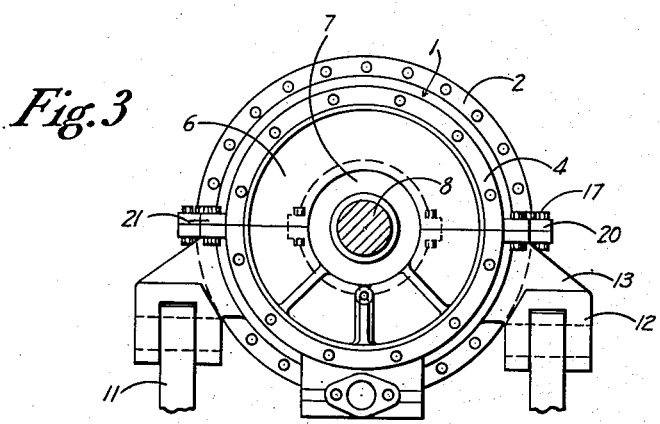
Figure 4:
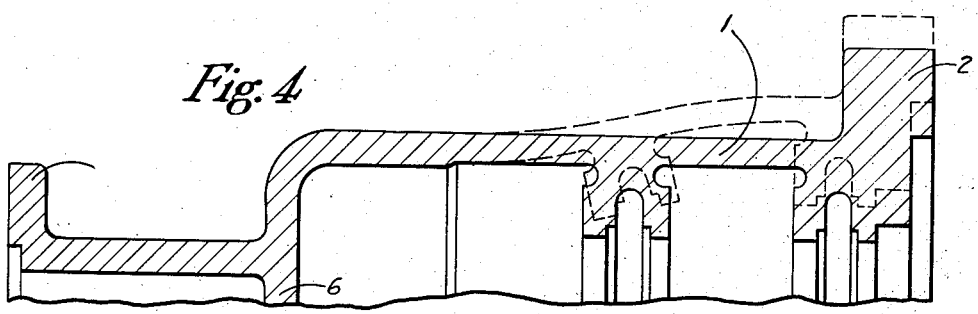

An embodiment of this invention is illustrated in the accompanying drawings in which Fig. 1 is a side view of a bearing case supporting one end of a gas turbine cylinder or other high temperature element; Fig. 2 is a plan view of the case with half of it shown in section; Fig. 3 is a view of the outer end of the case; and Fig. 4 is an enlarged longitudinal section of the case wall indicating an exaggerated deflection curve due to thermal expansion.

Referring to the drawings, a hollow member 1 is shown which is of general cylindrical shape; that is, it is circular in cross section. For the purpose of illustration the member is shown as a bearing case at one end of a gas turbine. The inner end of the case is encircled by an integral flange 2 by means of which the case is bolted to one end of the hot turbine cylinder 3. The other end of the case is encircled by another bolting flange 4 for connecting to it a shaft-enclosing member (not shown). Near its outer end the case also is provided interiorly with a continuous flange 6 that extends inwardly toward its axis and then turns and extends toward the inner end of the case to form a cylinder in the inner end of which a bearing 7 is mounted, as shown in Fig. 2. Journaled in this bearing is a shaft 8 projecting from a bladed rotor (not shown) disposed inside the turbine cylinder. The outer end of the shaft may be provided with a coupling 9 for connecting the turbine to the shaft that it is to drive. The case is supported by vertical links 11 pivoted at their upper ends to lugs 12 that are integrally connected by vertical webs 13 to opposite sides of the lower half of the case.

In order to permit the case to be assembled and disassembled it is divided in a horizontal axial plane into upper and lower half sections which meet at joints 16 extending lengthwise of the case on opposite sides thereof. These two sections are joined together by means of bolts 17 extending through adjoining bolting flanges projecting radially from the case on opposite sides of each joint.

The high temperature turbine heats the adjoining inner end of the bearing case and that heat is conducted by the wall of the case outwardly toward its outer end. Of course, the temperature of the wall gradually decreases as its outer end is approached, so the wall is subjected to a temperature gradient. Through about half the length of the case its temperature is high enough to noticeably expand the case radially, but the rest of the case remains cool enough to warrant disregard of expansion. The cool portion, and flange 2 at the inner end of the case, interfere with the conical shape that the thermally expanded portion otherwise would take, so the expanded portion assumes the general shape of a flattened reverse curve when the wall is viewed in longitudinal section. Such a curve is indicated in an exaggerated manner by the broken lines in Fig. 4. This distortion imposes some unavoidable, though non-injurious, thermal stress on the case, but to prevent the stress from being increased further it is a feature of this invention that no distortion-restraining projections nor attachments on the case are allowed in its distorted area except at the point of inflection of the reverse deflection curve. This applies to bolting flanges and case supports as well as to any other restraining elements that otherwise might be present.

Accordingly, the bolting flanges at each joint 16 are divided into longitudinally spaced sections in order to leave the distorted portions of the case wall, that are on opposite sides of the point of inflection of the deflection curve at the joints, free of flanges. One flange section 20 extends along the relatively cool outer half of the case with its inner end terminating approximately at the outer end of the distorted annular portion of the case. Another section 21 of each bolting flange projects from annular flange 2 at the inner end of the case. If desired, the flangeless joint between flanges 20 and 21 may be tightened by another set of bolting flanges or lugs 22 located at the point of inflection of the distortion curve, because at that point the case wall is substantially straight in longitudinal section and therefore the lugs will not restrain distortion of the wall. Consequently, the longitudinal bolting flanges are located only at the substantially straight parts of the case wall where they do not keep the wall adjacent the joints 16 from deflecting in the same way as the rest of the wall. The webs 13 that connect supporting lugs 12 to the lower half of the case join the case at the outer end of its annular distorted portion where they too have no effect on distortion. It is preferred to make the distorted portion of the wall thinner than the rest of it in order to reduce the force tending to "dish" flanges 2 and 6.

In the gas turbine in which the bearing case described herein is used, a large temperature gradient occurs in a short space, but, because of this invention, it does not cause undue strain to be placed on the annular portion of the case in which the temperature gradient takes place.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In apparatus having a high temperature part, a bearing case circular in cross section connected to one end of said part and heated thereby, whereby the wall of said case is subjected to a temperature gradient, said case being divided into two sections meeting at joints extending lengthwise thereof, longitudinally spaced bolting flanges projecting from said sections at the opposite ends of each of said joints, and bolts connecting adjoining flanges together to join said sections, the wall of the annular portion of said case between the longitudinally spaced flanges being thinner than the rest of the wall, and the wall of said annular portion being caused by said temperature gradient to distort in longitudinal section into the general shape of a reverse curve, the distorted portions of the wall on opposite sides of the point of inflection of said curve at the joints being free of distortion-restraining flanges.

2. In apparatus having a high temperature part, a bearing case circular in cross section disposed at one end of said part, the inner end of the case being encircled by a flange integral therewith, means fastening said flange to said end of the high temperature part, whereby the wall of the case is heated, said case being divided into two sections meeting at joints extending lengthwise thereof, radial flanges adjacent said encircling flange and projecting from said sections at each of said joints, additional radial flanges spaced longitudinally of the joints from the first-mentioned radial flanges and projecting from said sections, and means fastening adjoining radial flanges together to connect said sections, the annular portion of said case between said longitudinally spaced flanges being free of distortion-restraining projections and attachments so that it is caused by said heat to expand symmetrically in cross section while remaining circular.

3. A hollow member circular in cross section formed at one end for connection to a high temperature element with the opposite end of said member remaining relatively cool, whereby said member will be subjected to a temperature gradient that will expand it radially from said one end towards its opposite end into generally conical shape, the end portions of said member being adapted to retain substantially their original shapes when it is expanded and thereby distorting the intervening portion of the wall of said member in longitudinal section into the general shape of a reverse curve, the distorted portion of said wall being thinner than its adjoining portions, said member being divided into sections meeting at joints extending lengthwise thereof, longitudinally spaced radial flanges projecting from said sections at each of said joints, and means connecting adjoining flanges together to join said sections, said flanges being located only at both ends of said thin portion of the wall and at the point of inflection of said curve, whereby the flanges do not restrain distortion of the thin portion of the wall at the joints.

FRITZ O. HENNIG.

REFERENCES CITED

The following references are of record in the file of this patent:

UNITED STATES PATENTS

| Number | Name | Date |
|---|---|---|
| 437,954 | Werntz | Oct. 7, 1890 |
| 945,391 | Hodgkinson | Jan. 4, 1910 |
| 1,416,760 | Steenstrup | May 23, 1922 |
| 1,425,324 | Kennedy | Aug. 8, 1922 |
| 1,477,360 | Junggren | Dec. 11, 1923 |
| 1,491,423 | Rice | Apr. 22, 1924 |
| 1,522,191 | Junggren | Jan. 6, 1925 |
| 1,597,463 | Haughton | Aug. 24, 1926 |
| 2,068,648 | Kaplan | Jan. 26, 1937 |